Figure 1:
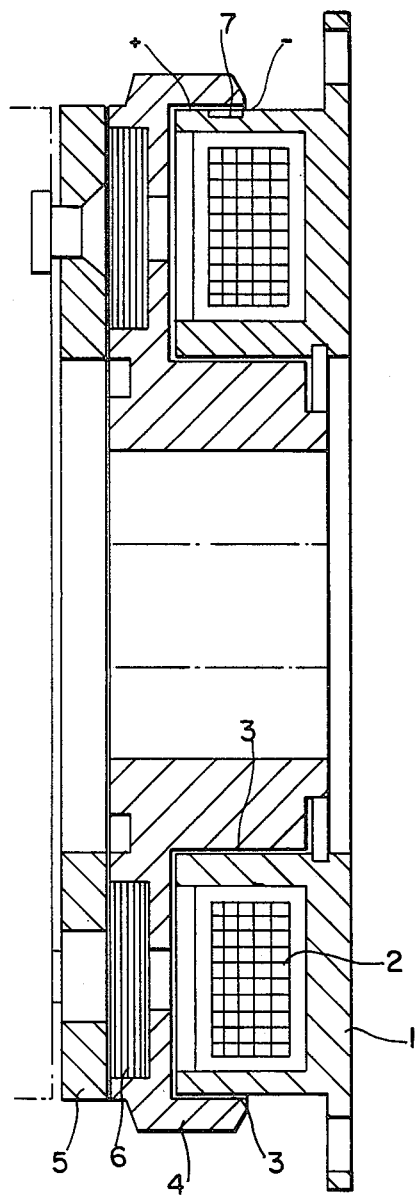

United States Patent [19]

Wilken et al.

[11] 4,353,446
[45] Oct. 12, 1982

[54] DEVICE FOR POSITIONING AND ATTITUDE-STABILIZING A SLEWABLE INERT/MASS/SUPPORTER ON ONE BASE

[75] Inventors: Joachim H. Wilken; Bernhard Stehlin, both of Ettlingen; Volker Pathe, Karlsruhe; Manfred Wamser, Karlsruhe; Ludwig Pietzsch, Karlsruhe, all of Fed. Rep. of Germany

[73] Assignee: Ludwig Pietzsch, Ettlingen, Fed. Rep. of Germany

[21] Appl. No.: 849,380

[22] Filed: Nov. 1, 1977

[30] Foreign Application Priority Data

Jun. 20, 1977 [DE] Fed. Rep. of Germany ....... 2727582

[51] Int. Cl.³ .......................... G05D 3/00; F41G 5/16
[52] U.S. Cl. ...................... 192/21; 192/48.2; 192/84 R; 192/84 AA; 192/84 C; 89/41 M
[58] Field of Search .......... 192/84 AA, 84 AB, 84 C, 192/21, 48.2, 84 R; 89/37.5 A, 41 M, 41 H

[56] References Cited

U.S. PATENT DOCUMENTS

| | | | |
|---|---|---|---|
| 1,185,326 | 5/1916 | Humphreys | 89/37.5 A |
| 1,784,504 | 12/1930 | Tanner | 192/84 AA |
| 2,510,880 | 6/1950 | Fredrikson | 192/84 AA |
| 3,387,689 | 6/1968 | Ovshinsky | 192/84 C |

Primary Examiner—Stephen C. Bentley
Attorney, Agent, or Firm—L. Lawton Rogers, III

[57] ABSTRACT

Method and apparatus for positioning and altitude-stabilizing an inert mass slewable on a movable base in at least one axis are disclosed. Oppositely rotatable driving parts are supported on either the base or the mass, and the driven parts on the other of the base or mass are friction coupled to the driving parts under the control of one or more control devices. The control devices are controllable electromagnetic clutches or brakes, and control of the magnetic field is achieved by the hyperexcitation through feedback and intensification of the measured magnetic field strength and/or the control torque.

46 Claims, 6 Drawing Figures

DEVICE FOR POSITIONING AND ATTITUDE-STABILIZING A SLEWABLE INERT/MASS/SUPPORTER ON ONE BASE

The invention concerns a device for positioning and attitude-stabilizing a slewable inert mass such as a tank gun supported on one base such as a vehicle hull in at least one axis having two oppositely rotatable driving parts which are supported on the base or the inert mass and controlled by one or two control devices and with the driving parts in friction contact with compressible driving parts which are supported on the mass or the base.

A device such as this is described in U.S. patent application Ser. No. 603,594, filed on Aug. 8, 1975 (Kauer et alii), which represents a continuation-in-part application of the parent application Ser. No. 349,660, filed on Apr. 3, 1973, now abandoned. Therewith, the control device encompasses a valve arrangement which, depending on the desired slewing direction of the directional or tracking torque to be produced, acts upon at least one of two pistons with a hydraulic pressure medium so that the piston presses a friction pad against one of two rotating disks or both pistons each press one friction pad against both rotating disks with differing contact pressure. Herewith, a control torque is transmitted for a short time from the rotatable supported disk on the base such as a mobile vehicle hull to the mass such as a gun in order to enable its accurate aiming and tracking also during a mobile state of the base. Owing to the fact that the inert mass in the normal state is connected, i.e., "balanced", with the base only through its bearing arrangement which can be low-friction configured, the inertia of the inert mass is completely used for stabilization so that the inert mass whose fulcrum is located in the vicinity of the center of gravity in the case of a motion of the base continues to remain in a fixed position as long as a directioning or tracking torque is not exerted on the inert mass in the manner described above by pressure of the friction pad against the disk.

The control device must, on one hand, show quite low response times and, on the other hand, make it possible for the entire torque required for aiming or tracking of the inert mass to be transmitted independently from the rotational speed of the disk, i.e., without nonlinearity. These requirements are satisfied by the control device according to the U.S. patent application Ser. No. 603,594, said adjusting device being inserted there as actuator in an automatic control circuit with an automatic controller of the first order (proportional plus rate action controller). The control device is a hydraulically operating special device which is expensive in both manufacture and maintenance, has a large space requirement and requires an expensive ducting of hydraulic fluid between parts rotating relative to each other. In addition, a hydraulic fluid source is not available for all typical applications.

The invention has the basic task of providing a device as initially described in which the abovementioned disadvantages are avoided. More particularly, the invention should enable well-tested, problem-free commercially available components to be used for the control device whereby the control device simplified in this manner would nevertheless still satisfy the abovementioned requirements, especially with respect to the minimum response time and the good control properties.

In order to solve this task, it is specified according to the invention that the one or more adjusting devices shows at least one controllable electromagnetic clutch or brake.

Electromagnetic clutches or brakes are commercially available and time-tested components. The energy required for positioning or stabilizing can be transmitted between the parts moving relative to each other by means of a magnetic field "through the air" between exciting coil and core. No duct is needed for the energy transport in contrast to the hydraulic solution. Electrical energy is available and easy to supply in practically all typical applications. Space requirement, maintenance cost and price of electromagnetic clutches or brakes are low.

In the case of commercially available electromagnetic clutches or brakes, the time lag between a modification of the voltage applied to the exciting coil and the subsequently produced torque is nevertheless quite large. In order, however, to achieve the required short response times, the controllability of the electromagnetic clutches or brakes which are moreover commercially available is specified according to the invention.

The magnetic field of the one or each electromagnetic clutch is advantageously controlled. The control of the magnetic field is satisfactorily achieved in that the exciting coil is hyperexcited by a feedback and intensification of the measured magnetic field strength. Alternatively or supplementarily, the control torque or control moment generated by the control device is nevertheless also measured and the measurement signal can be used through a feedback and intensification for hyperexcitement of the coil.

By the control of the magnetic field of the electromagnetic clutch or brake, it is made possible for the aboveindicated time lag or dead and response times to be able to be kept to minimum orders of magnitude as with the control device according to U.S. patent application Ser. No. 603,694 and accordingly maintaining the advantage of minimum response time. The device according to the invention is nevertheless simpler, cheaper, smaller and lighter than the well-known device owing to the use of a commercially available electromagnetic clutch or brake.

An electromagnetic clutch without slipring is preferably used. The primary side of the one or each electromagnetic clutch can be driven by means of its own drive motor and especially by means of an electric motor. An electric motor is to be preferred to any other drive such as a hydraulic drive or a combustion engine if combustibility is to be avoided. The drive of the primary side of the one or each electromagnetic clutch can nevertheless also be drawn from the traction drive of the self-propelled base such as the hull of a tank.

Especially in this case, a switching on and off of the drive of the primary side of a switchable clutch is advisable. The rotatable driving parts are connected in this case then only with one drive if this is required for stabilizing for an aiming or tracking movement. This saves drive energy. In the sense of such a saving, the drive for the primary side of the one or each electromagnetic clutch or brake can include a flywheel storage unit.

The device described and claimed enables a positioning and attitude stabilization in one axis. A stabilization in two or more axes can be accomplished by an appropriate arrangement on the two axes or more devices constructed as described and claimed. Alternatively, however, two axes can also be sufficient for stabilization, by way of example, when in all only one device as described and claimed is specified and this device takes effect through a branch gearing with two outputs on the two axes as described in German Patent Application No. P 27 16 720.0 (Pietzsch et alii), filed on Apr. 15, 1977.

In the case of an advantageous configuration of the invention, it is specified that the secondary side of the one or each electromagnetic clutch acts through a driven gear output on a gear fastened to the inert mass and that the gear-tooth system of the driven gear output in the drive direction is stressed against the gear-tooth system of the driven gear output in order to remove any backlash of teeth. This tension contributes to a further decrease in the dead or response times because the gear-tooth systems are always engaged in the drive direction and the time does not have to be spent for turning the drive gear until the backlash of teeth is overcome. Aside from this, this stress enables shock loads of the teeth surfaces and remaining drive components to be avoided when starting. The stress can be produced by always maintaining slight torques for both rotational directions in the electromagnetic clutches. Herewith, it is additionally achieved that inaccuracies in the zero point of the input current-torque characteristic can be compensated for to a certain extent.

For application of a restoring torque, instead of only for one direction of rotation, the electromagnetic clutches or brakes can be activated for the two directions of rotation whereby then the differential torque is controlled. Herewith, more output is indeed transformed into useless heat although the input current-torque characteristic with this operating mode can, however, be linearized.

Figure 2:
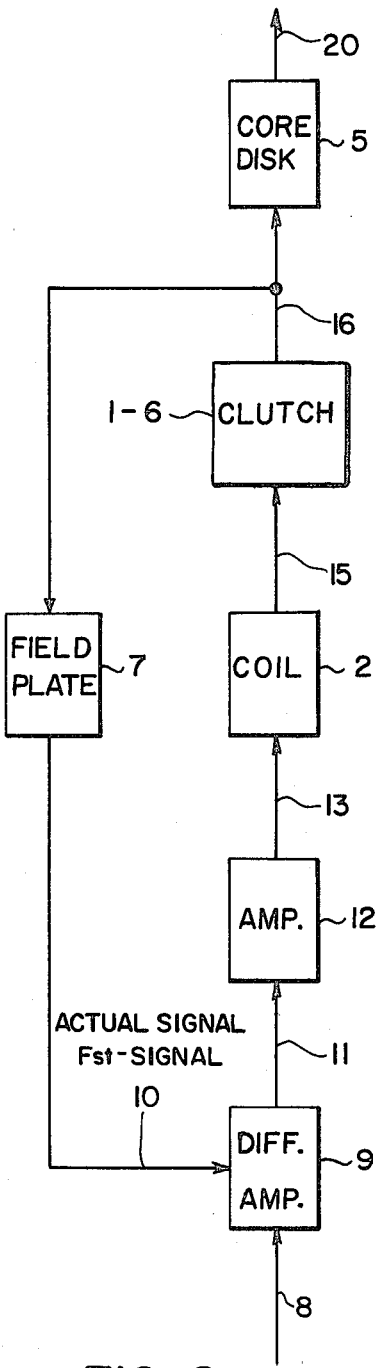
Figure 3:
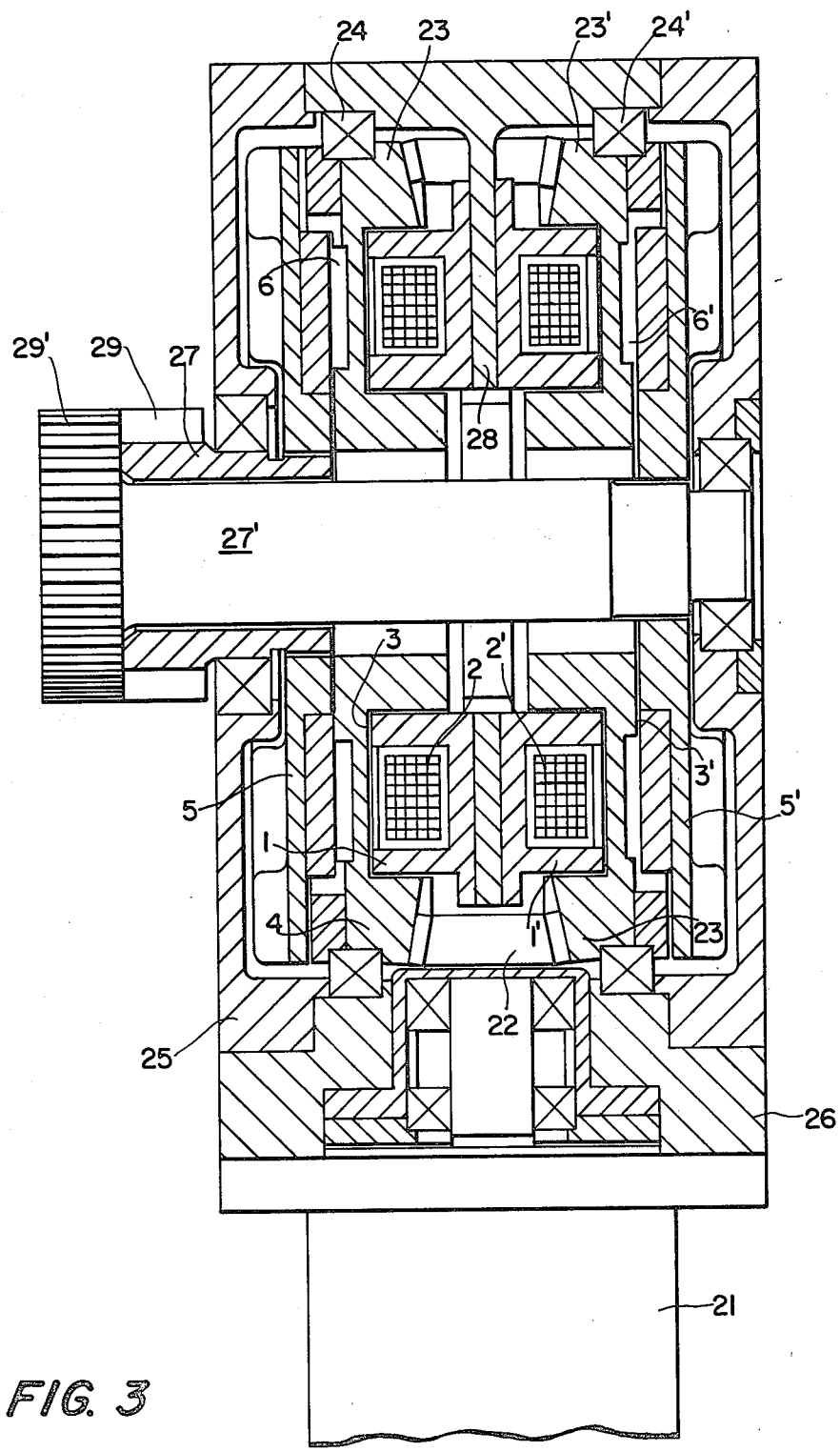
Figure 4:
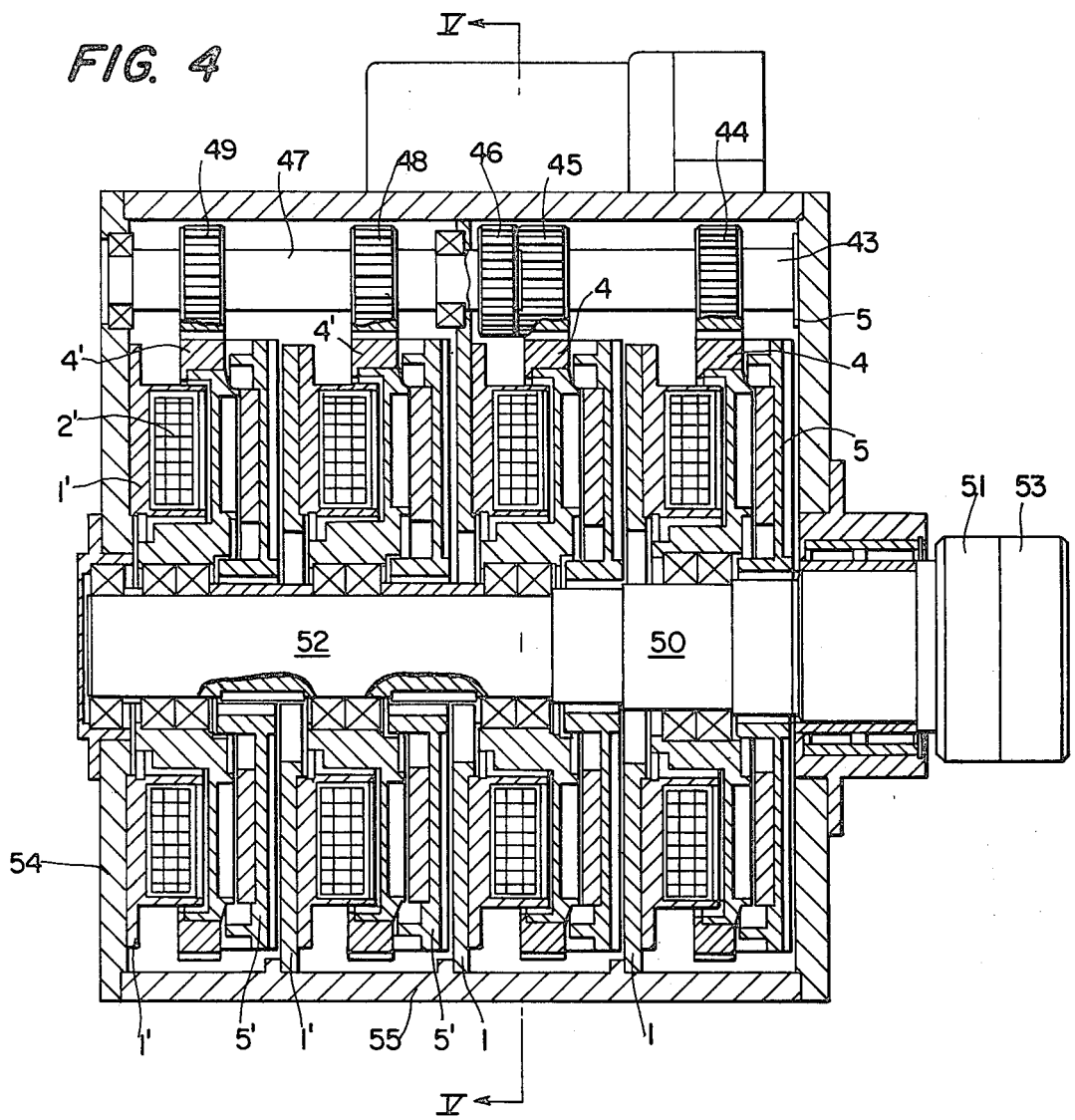
Figure 5:
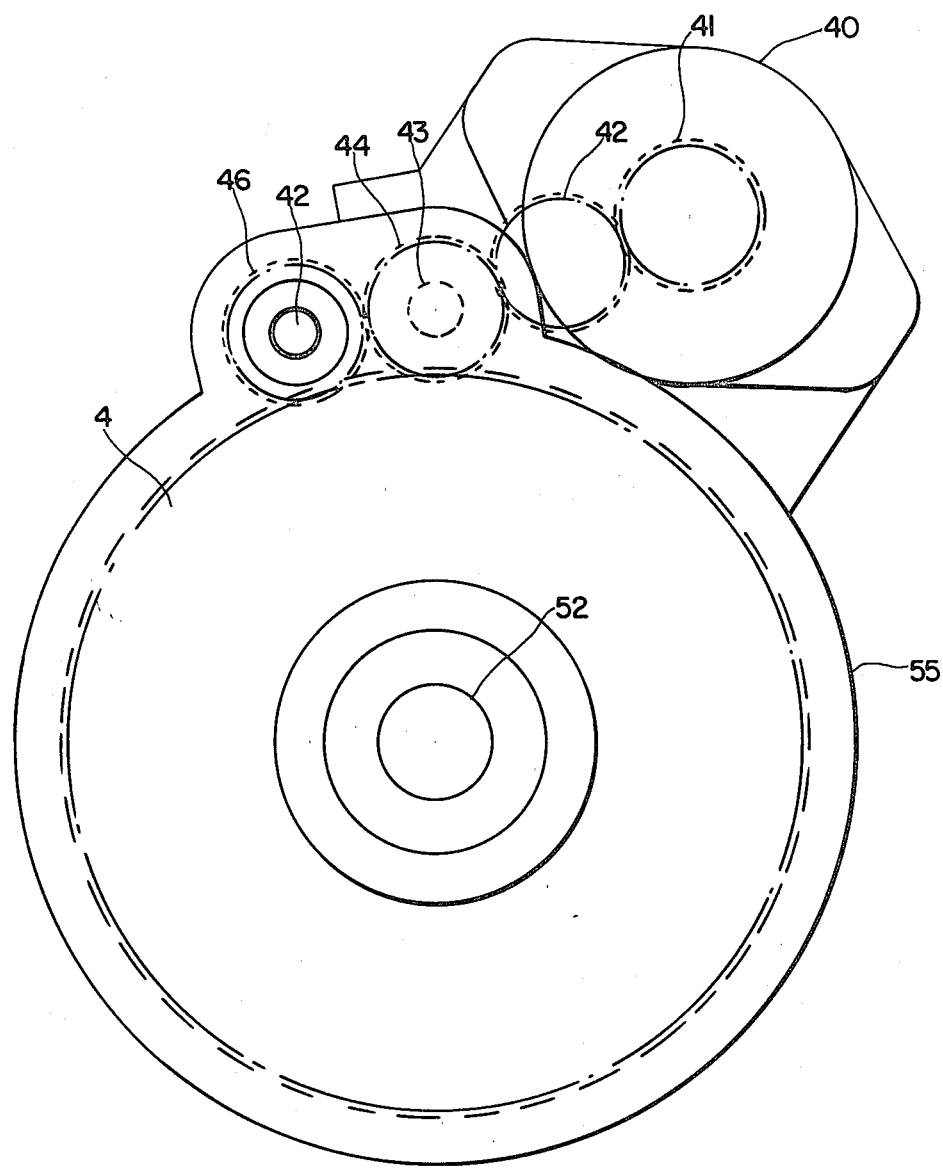

The invention is described more in detail in the following on the basis of schematic drawings on forms of construction. There may be seen FIG. 1: A cross section through a slipringless-controlled electromagnetic clutch used according to the invention as control device;

FIG. 2: A block diagram for the field variation of the electromagnetic clutch according to the invention;

FIG. 3: A cross section through an established construction with one electromagnetic clutch for each direction of rotation;

FIG. 4: A cross section through an arrangement with two groups of electromagnetic clutches for torque increase always connected in parallel; FIG. 5: A schematic cross section view in directions for arrows V—V in FIG. 4, and FIG. 6: An application diagram.

FIG. 1 shows a slipringless electromagnetic clutch as it is used in connection with a drive as control device for applying a directional torque or tracking torque to a slewable gun (not shown) supported on a vehicle hull. The electromagnetic clutch has as customary a stator 1 with a current coil 2. The stator 1 is separated from rotor 4 and core disk 5 by an air gap 3. A friction facing 6 is accommodated in rotor 4. If the current coil 2 is excited, a magnetic field is generated under whose influence the core disk 5 is pressed against friction facing 6. Herewith, in the case of an excited current coil 2, the core disk 5 is locked in by the, for example, continuously driven rotor 4. The transmitted torque which can be absorbed by the core disk is proportional to the magnetic field generated in the electromagnetic coil. The field strength of the magnetic field is measured in air gap 3 by means of a field plate 7 which delivers an electrical voltage proportional to the field strength.

The magnetic field strength of the magnetic field excited by the current coil is controlled for the purpose of shortening the relatively high dead or response time with electromagnetic clutches of the type described. In this regard, an internal automatic control system is specified according to FIG. 2.

The nominal signal proportional to a desired control torque of the electromagnetic clutch is fed with 8 into the automatic control system and delivered to a differential amplifier 9 where the nominal signal is compared with an actual signal recovered by the measurement using field plate 7 and introduced at 10 into the differential amplifier. The signal difference 11 is amplified in a voltage amplifier 12 with whose output voltage 13 the current coil 2 of the electromagnetic coupling is controlled. The stator current 15 building up against the inductivity of the electromagnetic clutch generates a magnetic field 16 which encompasses the iron components and the air gap 3 of the electromagnetic clutch 1 to 6. The magnetic field increased in this way is again measured by means of field plate 7 which returns the actual signal through 10 to the differential amplifier 9. The core disk 5 and rotor 4 of the clutch generate a torque proportional to the controlled magnetic field 16 after a response time in the order of magnitude of milliseconds which is very short owing to the control and whereby this torque is delivered by core disk 5 at 20. In the case of the described solution, rotor 4 is continuously driven by a drive not shown, e.g., an electric motor.

The established construction according to FIG. 3 encompasses two electromagnetic clutches with stators 1,1' with therein arranged current coils 2,2', rotors 4,4' which are separated from the stators by air gap 3,3' in the inactivated state of the clutch. The stators accommodate rotors 4,4', ring-shaped friction facing 6,6' and therewith the core disks 5,5' working together in friction contact in the coupled state.

The rotors 4,4' are driven oppositely directed through a bevel drive gear box by a common hydraulic motor 21. The pinion 22 of the bevel drive gear box is connected torque-rigid with the hydraulic motor 21 and is supported in a housing component 26 firmly bolted with a housing ring 25. The pinion 22 acts on two-axle drive bevel wheels 23,23' which are firmly connected with the respective rotor 4,4'. The axle drive bevel wheels 23,23' are supported in housing ring 25 on ball bearings 24,24'.

The two stators 1,1' are firmly connected by means of a crossbar 28 of the housing ring whereas the core disks 5,5' are arranged on the coaxial output shafts 27,27' and are torque-rigid although axially shiftable. The output shaft 27' travels through therewith the hollow-formed output shaft 27. The two output shafts 27,27' support drive gears 29,29' adjacent to one another. On the basis of the described arrangement with the bevel drive gear box 22,23,23', the output shafts 27,27' necessarily turn oppositely directed when optionally one of the electromagnetic clutches 1 to 6 or 1' to 6' is activated. In this way, optionally controlled directional or tracking torques can be made available to the drive gears 28,29' in either direction of rotation and there delivered to a toothed wheel rim not shown and which is connected with the inert mass such as a gun likewise not shown which is slewable on a base such as a vehicle hull. The housing 25 is firmly connected with the abovementioned base.

It is understood that the electromagnetic clutches 1 to 6 or 1' or 6' always show an internal automatic control system in accordance with FIG. 2 including field plates 7,7' (FIG. 1) for measuring the magnetic field.

The hydraulic motor 21—instead of which an electric motor can also be prescribed—drives the rotors 4,4' steadily through the axle drive bevel wheels 23,23'. If the electromagnetic clutch is activated by exciting one of the current coils 2,2', it follows that a torque proportional to the magnetic field strength is immediately available at one of the drive gears 29,29'.

In order herewith to also have no delay by overcoming a backlash of teeth between the driven gear outputs 29 or 29' and the therewith coworking toothed wheel rim, the gears 29 are always stressed in the drive direction with the gear tooth system of the toothed wheel rim not shown so that the teeth surfaces of the gear 29 on the driving side always are applied to the teeth surfaces of the toothed wheel rim and likewise the teeth surfaces of the driven gear output 29' on the teeth surfaces of the toothed wheel rim lying in the opposite direction. The tension takes place preferentially in that slight torques are always maintained in the two clutches.* With the solution according to FIGS. 4 and 5, two groups of electromagnetic clutches are always provided. Both groups are driven by a common electric motor 40. The drive pinion 41 of the electric motor 40 drives through an intermediate gear wheel 42 a first input shaft 43 which drives through gears 44,45 the primary rotors 4 of the first group of electromagnetic clutches. The gear 45 simultaneously meshes with a gear 46 of a second input shaft 47 which drives through gears 48,49 the rotors 4' of the second group of electromagnetic clutches.

*Accordingly, keeps both clutches engaged with minimal contact pressure. It is also possible to act simultaneously on the two clutches 1 to 6 and 1' to 6' with actuation (with a greater different contact pressure) on the two clutches and utilize the differential torque which is controlled in this case for stabilizing or positioning. This indeed leads to an increased power requirement but nevertheless enables a compensation for nonlinearities in the rotational speed-torque characteristic.

The electromagnetic clutches of both groups are built in principle and as described on the basis of FIGS. 1 and 3, such that they are not again further described here. It may be noted that the core disks 5 of the first group of electromagnetic clutches are torsion-resistant although axially shiftable (for example, through splines) and worked together with a first hollow output shaft 50 which carried a driven pinion 51 whereas the core disks 5' of the second group of electromagnetic clutches, torsion-resistant although axially shiftable, work together with a second output shaft 52 carries a driven pinion 53 and passes through the first output shaft 51.

The stators 1,1' with corresponding current coils 2,2' are connected with fixed housing components namely the stator located farthest left in FIG. 4 and having a housing cover 54 and all remaining stators 1 or 1' with an essentially cylindrical housing body 55.

The electromagnetic clutches of each group are accordingly arranged in parallel circuit and accordingly cause a torque increase in a construction mode which is economical in space whereby each group of electromagnetic clutches acts on one of the two oppositely driven output shafts 50,52.

Figure 6:
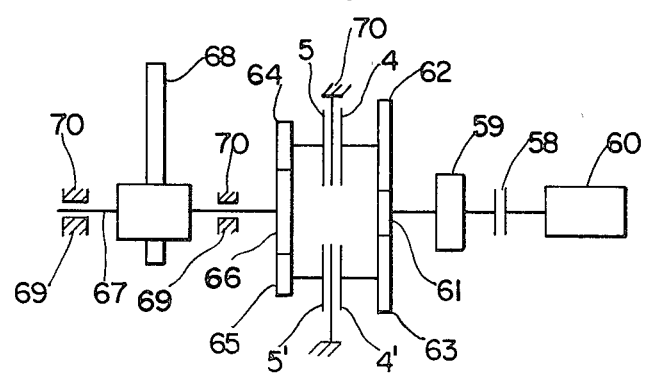

FIG. 6 shows an application diagram. In this case, for the sake of simplicity in portrayal, the two electromagnetic clutches 1 to 6 or 1' to 6' instead of understandably also being specified in accordance with FIG. 4 the groups of electromagnetic clutches were not arranged in the construction mode economical of space in accordance with FIGS. 3 or 4 and 5 but parallel to one another.

In the diagram, a common drive motor 60 drives through a quick-acting clutch 58 and a flywheel storage unit 59 and a driven pinion 61 drives two gears 62,63 in opposite directions. The drive motor 60 is, for example, the traction motor of a tank. The gears 62 and 63 can be connected with driven gear outputs 64,65 which mesh with one gear 66 through electromagnetic clutches 1 to 6 or 1' to 6'. This gear 66 is fixed and coaxial with the trunnion 67 of a gun 68. This gun 68 is supported and slewable in the low friction bearing 69 on the hull of a tank characterized by reference designation 70 or of another vehicle. The stators 1 or 1' as well as the drive motor 60 are also supported on the hull 70. In the non-actuated state of clutches 1 to 6 or 1' to 6', the gun 68 is supported on hull 70 only by the low friction bearings and will persist in remaining in the same position owing to their inertia independent from motions of hull 70. If a directional or tracking movement is to be transmitted to the gun, it follows that the appropriate electromagnetic clutch is activated and thereby connects the primary rotor 4 or 4' with the corresponding driven gear output 64,65 through a controlled friction contact. In this way, a directional torque can be quite quickly, simply and accurately applied to gun 68.

We claim:

1. Device for positioning and attitude-stabilizing a slewable inert mass supported on a base, said device having at least two oppositely-directed rotatable driving parts supported on one of the base and the inert mass by means of at least one control device regulated in friction contact with compressible driven parts, said driven parts being supported on the other of the mass and base, said control device having at least one electromagnetic clutch or brake in which the magnetic field is controlled by hyperexcitation of the exciting coil through feedback and intensification of the measured magnetic field strength.

2. Device according to claim 1 including at least one electromagnetic clutch or brake in each direction of rotation.

3. Device according to claim 2 wherein the electromagnetic clutches for both directions of rotation can be simultaneously actuated; and,
    wherein the differential torque resulting from the oppositely directed torques is controlled.

4. Device according to claim 3 wherein said control device has a plurality of electromagnetic clutches in parallel arrangement.

5. Device according to claim 4 wherein the primary winding of the electromagnetic clutches of said control device are driven by a common source; and
    wherein the secondary windings act on a common drive.

6. Device according to claim 3 wherein the primary winding of said electromagnetic clutch or brake is driven by means of an electric motor.

7. Device according to claim 3 characterized in that the drive of the primary winding of said electromagnetic clutch or brake is derived from the traction drive of the self-propelled base.

8. Device according to claim 7 wherein said drive is connected with the primary winding of said electromagnetic clutch through a switchable clutch.

9. Device according to claim 8 wherein the drive of the primary winding includes the electromagnetic clutch of a flywheel storage unit.

10. Device according to claim 9 wherein the secondary winding of said electromagnetic clutch acts through a drive gear tooth system on a gear tooth system attached to the inert mass; and
   wherein the output gear tooth system in the drive direction is stressed against the gear tooth system of the mass in order to remove any backlash of gear teeth.

11. Device according to claim 2 wherein the primary winding of said electromagnetic clutch or brake can be driven by means of a characteristic drive motor such as an electric motor.

12. Device according to claim 11 wherein the drive is connected with the primary winding of said electromagnetic clutch through a switchable clutch.

13. Device according to claim 2 characterized in that the drive of the primary winding of said electromagnetic clutch or brake is derived from the traction drive of the self-propelled base.

14. Device according to claim 13 wherein the drive of the primary winding includes the electromagnetic clutch of a flywheel storage unit.

15. Device according to claim 1 wherein the primary winding of said electromagnetic clutch or brake is driven by means of an electric motor.

16. Device according to claim 15 wherein the drive is connected with the primary winding of said electromagnetic clutch through a switchable clutch.

17. Device according to claim 16 wherein the drive of the primary winding includes the electromagnetic clutch of a flywheel storage unit.

18. Device according to claim 17 wherein the secondary winding of said electromagnetic clutch acts through a drive gear tooth system on a gear tooth system attached to the inert mass; and
   wherein the output gear tooth system in the drive direction is stressed against the gear tooth system of the mass in order to remove any backlash of gear teeth.

19. Device according to claim 1 characterized in that the drive of the primary winding of said electromagnetic clutch or brake is derived from the traction drive of the self-propelled base.

20. Device according to claim 19 wherein the drive is connected with the primary winding of said electromagnetic clutch through a switchable clutch.

21. Device according to claim 20 wherein the drive of the primary winding includes the electromagnetic clutch of a flywheel storage unit.

22. Device according to claim 21 wherein the secondary winding of said electromagnetic clutch acts through a drive gear tooth system on a gear tooth system attached to the inert mass; and
   wherein the output gear tooth system in the drive direction is stressed against the gear tooth system of the mass in order to remove any backlash of gear teeth.

23. Device according to claim 1 wherein the secondary winding of said electromagnetic clutch acts through a drive gear tooth system on a gear tooth system attached to the inert mass; and
   wherein the output gear tooth system in the drive direction is stressed against the gear tooth system of the mass in order to remove any backlash of gear teeth.

24. Device for positioning and attitude stabilizing a slewable inert mass supported on a base, said device having at least two oppositely-directed rotatable driving parts supported on one of the base and the inert mass by means of at least one control device regulated in friction contact with compressible driven parts, said driven parts being supported on the other of the mass or base, said control device having at least one controllable electromagnetic clutch or brake in which the magnetic field is controlled by hyperexcitation of the exciting coil through feedback and intensification of the measured controlling torque.

25. Device according to claim 24 including at least one electromagnetic clutch or brake in each direction of rotation.

26. Device according to claim 25 wherein the electromagnetic clutches for both directions of rotation can be simultaneously actuated; and,
   wherein the differential torque resulting from the oppositely directed torques is controlled.

27. Device according to claim 26 wherein said control device has a plurality of electromagnetic clutches in parallel arrangement.

28. Device according to claim 27 wherein the primary winding of the electromagnetic clutches of said control device are driven by a common source; and
   wherein the secondary windings act on a common drive.

29. Device according to claim 26 wherein the primary winding of said electromagnetic clutch or brake is driven by means of an electric motor.

30. Device according to claim 26 characterized in that the drive of the primary winding of said electromagnetic clutch or brake is derived from the traction drive of the self-propelled base.

31. Device according to claim 30 wherein said drive is connected with the primary winding of said electromagnetic clutch through a switchable clutch.

32. Device according to claim 31 wherein the drive of the primary winding includes the electromagnetic clutch of a flywheel storage unit.

33. Device according to claim 32 wherein the secondary winding of said electromagnetic clutch acts through a drive gear tooth system on a gear tooth system attached to the inert mass; and
   wherein the output gear tooth system in the drive direction is stressed against the gear tooth system of the mass in order to remove any backlash of gear teeth.

34. Device according to claim 25 wherein the primary winding of said electromagnetic clutch or brake can be driven by means of a characteristic drive motor such as an electric motor.

35. Device according to claim 34 wherein the drive is connected with the primary winding of said electromagnetic clutch through a switchable clutch.

36. Device according to claim 25 characterized in that the drive of the primary winding of said electromagnetic clutch or brake is derived from the traction drive of the self-propelled base.

37. Device according to claim 36 wherein the drive of the primary winding includes the electromagnetic clutch of a flywheel storage unit.

38. Device according to claim 24 wherein the primary winding of said electromagnetic clutch or brake is driven by means of an electric motor.

39. Device according to claim 38 wherein the drive is connected with the primary winding of said electromagnetic clutch through a switchable clutch.

40. Device according to claim 39 wherein the drive of the primary winding includes the electromagnetic clutch of a flywheel storage unit.

41. Device according to claim 40 wherein the secondary winding of said electromagnetic clutch acts through a drive gear tooth system on a gear tooth system attached to the inert mass; and
   wherein the output gear tooth system in the drive direction is stressed against the gear tooth system of the mass in order to remove any backlash of gear teeth.

42. Device according to claim 24 characterized in that the drive of the primary winding of said electromagnetic clutch or brake is derived from the traction drive of the self-propelled base.

43. Device according to claim 42 wherein the drive is connected with the primary winding of said electromagnetic clutch through a switchable clutch.

44. Device according to claim 43 wherein the drive of the primary winding includes the electromagnetic clutch of a flywheel storage unit.

45. Device according to claim 44 wherein the secondary winding of said electromagnetic clutch acts through a drive gear tooth system on a gear tooth system attached to the inert mass; and
   wherein the output gear tooth system in the drive direction is stressed against the gear tooth system of the mass in order to remove any backlash of gear teeth.

46. Device according to claim 24 wherein the secondary winding of said electromagnetic clutch acts through a drive gear tooth system on a gear tooth system attached to the inert mass; and
   wherein the output gear tooth system in the drive direction is stressed against the gear tooth system of the mass in order to remove any backlash of gear teeth.

* * * * *